US008870083B2

(12) United States Patent
Myers et al.

(10) Patent No.: US 8,870,083 B2
(45) **Date of Patent: *Oct. 28, 2014**

(54) MATTRESS AGE INDICATOR

(75) Inventors: Terrance L. Myers, Joplin, MO (US); John A. Garrett, Carthage, MO (US)

(73) Assignee: L&P Property Management Company, South Gate, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/406,053

(22) Filed: Feb. 27, 2012

(65) Prior Publication Data

US 2013/0221114 A1 Aug. 29, 2013

(51) Int. Cl.

| | |
|---|---|
| ***G06K 19/06*** | (2006.01) |
| ***A47C 20/00*** | (2006.01) |
| ***A47C 17/00*** | (2006.01) |
| ***G04B 47/00*** | (2006.01) |
| ***G04B 37/12*** | (2006.01) |

(52) U.S. Cl.
USPC ....... 235/494; 5/639; 5/694; 368/10; 368/278

(58) Field of Classification Search
USPC ............. 235/375, 487, 494; 368/278; 40/320, 40/631
See application file for complete search history.

(56) References Cited

U.S. PATENT DOCUMENTS 5,533,459 A 7/1996 Fontana
5,802,015 A 9/1998 Rothschild et al.
5,928,504 A 7/1999 Hembre et al.
6,255,801 B1 7/2001 Chalasani
6,279,170 B1 8/2001 Chu
6,337,836 B1 1/2002 Eidelson
6,557,760 B2 * 5/2003 Goodwin, III ................ 235/383
6,750,772 B2 * 6/2004 Skerker et al. ................ 340/585
6,758,980 B2 7/2004 Prater et al.
6,795,376 B2 9/2004 Quine
6,826,119 B2 * 11/2004 Fortune ........................... 368/10
7,079,019 B1 7/2006 Ruggiero
7,177,557 B2 2/2007 Kreckel
7,248,147 B2 7/2007 Debord et al.
7,495,558 B2 * 2/2009 Pope et al. ................. 340/572.1
7,532,106 B2 5/2009 Debord et al.
7,532,544 B2 * 5/2009 Morse ............................ 368/19
7,675,409 B2 * 3/2010 Jensen et al. ............... 340/539.1
2001/0036129 A1 * 11/2001 Carr .............................. 368/109
2003/0029062 A1 2/2003 Esterman (Continued)

FOREIGN PATENT DOCUMENTS

WO 2011139671 11/2011

OTHER PUBLICATIONS

Bordeaux, QR Codes Provide Mobile Marketing In-Store, Sundog, Sep. 21, 2010, retrieved from internet: <URL: http://www.sundoginteractive.com/sunblog/posts/qr-codes-provide-mobile-marketing-in-store>, 2 pages.

*Primary Examiner* — Thien M Le
*Assistant Examiner* — April Taylor
(74) *Attorney, Agent, or Firm* — Wood, Herron & Evans, LLP

(57) ABSTRACT

A mattress age indicating device includes an enclosure, and an indicating assembly contained within the enclosure. The age indicating device may be configured to present an indication related to the mattress's age and may be coupled to the mattress or other bedding or seating product.

25 Claims, 3 Drawing Sheets

(56) References Cited

U.S. PATENT DOCUMENTS

| | | | | |
|---|---|---|---|---|
| 2006/0256664 | A1* | 11/2006 | Varon | 368/89 |
| 2007/0284333 | A1* | 12/2007 | Dunnigan | 215/386 |
| 2009/0199857 | A1 | 8/2009 | Peake et al. | |
| 2009/0201773 | A1 | 8/2009 | Wilson et al. | |
| 2010/0051707 | A1* | 3/2010 | Conzelmann | 235/494 |
| 2010/0052908 | A1* | 3/2010 | Doan et al. | 340/572.1 |
| 2010/0287057 | A1* | 11/2010 | Aihara et al. | 705/16 |
| 2012/0147712 | A1* | 6/2012 | Lynn et al. | 368/89 |

* cited by examiner

MATTRESS AGE INDICATOR

TECHNICAL FIELD

The present invention relates generally to age indicating devices for products, and may find application in bedding and seating products.

BACKGROUND

Most products have limited useful lifetimes, which generally span from when a product is new (or ready to be used) to when it is fails to function properly and consequently, may be less useful than when it was new. Thus, products go through several stages during their lifetimes, including what may be characterized as a beginning, a middle, and an end. The lifetime of a product may be generally understood with reference to the nature of the product. For some products, their lifetime may be determined mostly by the passage of time. A piece of fruit, for example, generally has a lifetime that comes to an end when the piece of fruit becomes overripe and is no longer palatable, which happens with the passage of time. For some products, their lifetime may be determined primarily by the amount of use of the product. A traditional wooden pencil, for example, reaches the end of its lifetime after it is used and sharpened so many times that the wooden cylinder surrounding the graphite core cannot be sharpened any further, or until the wooden cylinder is reduced to a size where the pencil is no longer desirable for use. And for some products, their lifetime may be determined mostly by a combination of the passage of time and the amount of use of the product. A rubber bicycle tire, for example, may degrade and dry out over time and may be worn down by use.

Effective use of a product generally includes using the product during its useful lifetime, and discontinuing use of the product once the product reaches the end of its useful lifetime. Determining what stage of its lifetime a product is in may be difficult for a potential user, especially for a product that doesn't provide readily apparent indications about where it is along its useful life.

In some circumstances, a change in the user of a product may influence the product's useful lifetime. For example, a change in a user's health status might influence whether a particular product is still useful to the user. In addition, a change in a user's preferences might influence whether the user perceives the product as useful.

Mattresses provide an example of a product whose useful lifetime may be influenced by its age, use, and a user's preferences. A mattress typically includes a cover made of durable upholstery which may be partially or entirely covered by a mattress pad and/or sheets while the mattress is being used. Because of this covering, a superficial visual inspection of a mattress surface may not reveal the amount of use the mattress has seen or the age of the mattress, which may be factors in determining its useful life. A potential purchaser of the mattress may be deceived or misinformed regarding the remainder of the useful life of the mattress. Moreover, some mattress owners may find it difficult to recall exactly when the mattress was purchased or how long or how often the mattress has been used. The amount of time a mattress owner has owned a mattress may be relevant, as mattress owners may prefer different mattress qualities (such as stiffness) at different stages in their lives. Thus, mattresses in particular and products generally present problems in terms of understanding how far along (or how far beyond) they are in their useful lifetime.

Thus, a need exists in the art for apparatus that may assist product owners with understanding when a product is nearing the end, or has been used past the end of, its useful lifetime. Such apparatus may have application with respect to mattresses.

SUMMARY OF THE INVENTION

According to one embodiment of the invention, a mattress age indicating device includes an enclosure, and an indicating assembly contained within the enclosure. The device may be configured to present an indication related to the mattress's age and may be coupled to the mattress.

According to another embodiment of the invention, an age indicating device for a bedding or seating product includes an indicating assembly and an enclosure surrounding the indicating assembly. The indicating assembly includes a timer, a controller, and an indicator, which cooperate to present an indication related to the bedding or seating product's age.

According to another embodiment of the invention, an age indicating device for use with an associated product includes an enclosure and an indicating assembly contained within the enclosure. The indicating assembly is configured to present an indication to a user related to the product's age.

BRIEF DESCRIPTION OF THE DRAWINGS

The accompanying drawings, which are incorporated in and constitute a part of this specification, illustrate embodiments of the invention and, together with the general description given above and the detailed description of the embodiments given below, serve to explain the principles of the invention. In the figures, corresponding or like numbers or characters indicate corresponding or like structures.

DETAILED DESCRIPTION OF THE ILLUSTRATIVE EMBODIMENTS

Figure 1:
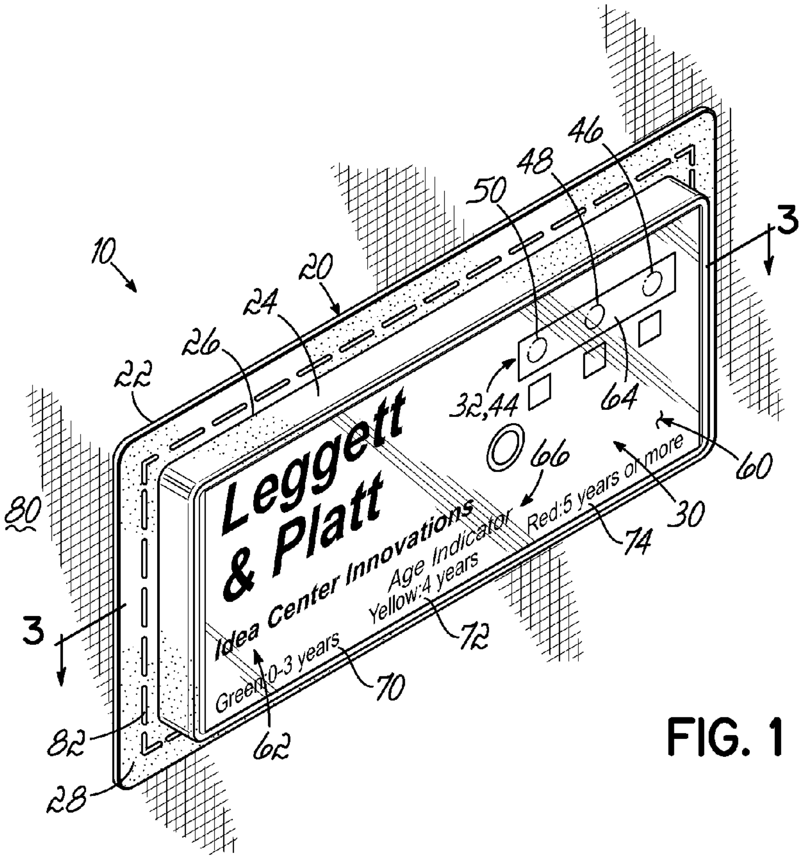
FIG. 1 is an isometric view of a product age indicating device attached to a surface by stitching.
Figure 2:
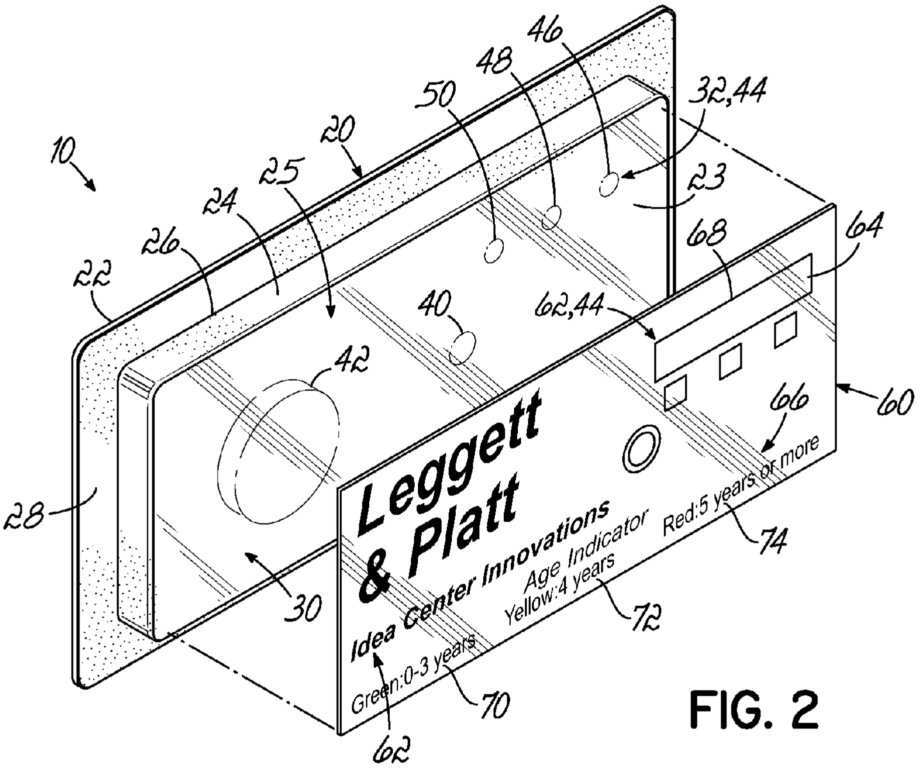
FIG. 2 is a partial disassembled isometric view of the product age indicator of FIG. 1, showing a label may be attached to an enclosure of the device.

Referring to the figures, a product age indicating device is generally indicated by the numeral 10, and includes an enclosure 20 and an indicating assembly 30. Many features of the product age indicating device 10 are discussed in the context of a mattress age indicating device, but other suitable applications for an age indicating device as disclosed herein will be appreciated.

The enclosure 20 contains and protects the indicating assembly 30, and includes a back 22, a front 23 and a continuous sidewall 24 defining an interior space 25. The indicating assembly 30 is located and positioned inside the interior space 25 of the enclosure 20. The back 22 and sidewall 24 of enclosure 20 are joined along an edge 26. A frame portion 28 of the back 22 extends outwardly from the edge 26 around the indicating assembly 30, and may be, for example, a continuation of the back 22, the sidewall 24, or both. In some embodiments, the frame portion 28 may provide a useful portion for attaching the age indicating device 10 to a surface, as will be described below. In some embodiments, the frame portion 28 may be omitted.

The enclosure 20 is designed to create an environment for the indicating assembly 30 that is impervious to the ingress of air, water, dust, fibers, or any other substance that might interfere with the function of the indicating assembly 30. The enclosure 20 may be made of any suitable material, such as, for example, plastic, rubber, rubberized polymers, and the like. In some embodiments, the back 22, the front 23, the sidewall 24, or any combination thereof, may be partially or substantially flexible, and in some embodiments, the back 22, front 23 or the sidewall 24 may be sufficiently rigid to provide structural protection to the components of the indicating assembly 30, somewhat preventing them from being crushed.

In some embodiments, the entire enclosure 20 may be partially or substantially transparent, and in other embodiments, portions of the enclosure 20 may be partially or substantially transparent, including portions of the back 22, front 23 or the sidewall 24.

Figure 4:
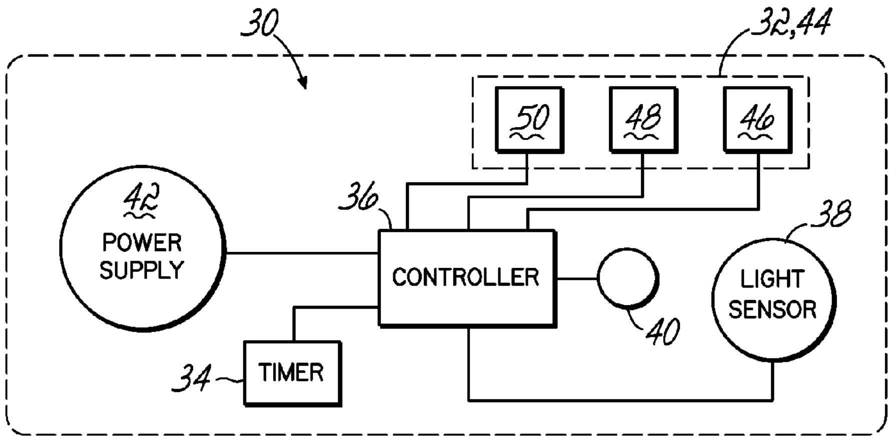
FIG. 4 is a schematic representation of features of a product age indicator.

Turning to the components of the indicating assembly 30 shown schematically in FIG. 4, they generally include an indicator 32, a timer 34, a controller 36, a light sensor 38, a test button 40, and a power source 42. The indicator 32, the timer 34, the light sensor 38, the test button 40, and the power source 42 are all operatively connected through the controller 36.

The controller 36 controls all of the components of the indicating assembly 30, including those discussed below. The controller 36 is in communication with and may gather information from, or send information to, the indicator 32, the timer 34, the light sensor 38, the test button 40, and the power source 42. For example, the controller 36 controls the activation and deactivation of the indicator 32.

The indicator 32 presents an indication to an observer relating to the age of an associated product, such as, for example, a mattress. The indicator 32 may be visual, auditory, or any other perceivable indication. In the figures, indicator 32 is a visual indicator 44 that includes an array of light emitting diodes (LEDs), including a red LED 46, a yellow LED 48, and a green LED 50. For such an arrangement, the controller 36 controls the visual indicator 44 and selectively activates and deactivates the LEDs 46, 48, and 50 to create an indication relating to the age of the mattress, as determined by the timer 34. For example, the green LED 50 could be activated when the mattress is nearly new, or when it is between zero and three years old. The yellow LED 48 could be activated when the mattress is in a middle stage of its lifetime, or when it is about four years old. And the red LED 46 could be activated when the mattress is near the end of its lifetime, or when it is five or more years old. The indicator 32 may be controlled by the controller 36 so that the indications it creates are presented on a pre-determined interval, constantly, or otherwise. For example, the controller 36 may activate the indicator 32 on a daily basis. Other activation options may also be desirable. As one example, if a user presses the test button 40, the controller 36 may perform a single sequence where the indicator 32 is activated for 0.33 seconds, deactivated for 0.33 seconds, re-activated for 0.33 seconds, and then deactivated. As another example, if the light sensor 38 senses that the age indicating device 10 is exposed to light, the controller may perform a sequence where the indicator 32 is activated for 0.33 seconds, inactivated for 0.33 seconds, re-activated for 0.33 seconds, and then deactivated for 5 seconds. The controller 36 may repeat the sequence for 10 minutes, and then deactivate the indicator 32, unless the light sensor 38 senses that the age indicating device 10 is no longer exposed to light in which case the controller 36 may deactivate the indicator 32. And of course, an indicator may include other forms of a visual indicator, such as a one-LED or two-LED visual indicator, for example, color changing dyes or color changing materials, or any other suitable structure for creating a perceivable indication. A non-limiting example of another form that the indicator may have is an audible alarm or voice notice. The LED colors and ages used herein are merely exemplary; the present document is not intended to limit these colors or ages of the product indicated by these activated LEDs.

The timer 34 counts time and may include any suitable timing circuit generally available in the marketplace, including quartz crystal timers. For a product whose lifetime is influenced by the passage of time, the timer 34 may provide information about the age of the product. Such may be useful, for example, if the product's owner is unaware of or cannot recall the age of the product. In the case of a mattress, the timer 34 may provide information about the age of the mattress, and this information is used by the controller 36 to provide an appropriate indication via the indicator 32, as discussed above.

The light sensor 38, which may be included in some embodiments but not in others, may provide information to the controller 36 about whether the age indicating device 10 is exposed to light. Such information may be useful in the case of a mattress, as mattresses are often covered by a mattress pad and sheets. A user may not want any of the LEDs activated when the mattress is covered with a mattress pad and sheets. Such light may interfere with a user's sleep. However, the user may desire to know the age of the mattress or product when these items are removed from the mattress and the light sensor 38 is exposed to light. When the light sensor 38 is exposed to light it may communicate with the controller 36 so that the indicator 32 is activated. In such a case, and especially where a visible indication is used, the indication created by the indicator 32 will be more readily perceived by a nearby user.

The light sensor 38 may also be configured to communicate with the controller 36 in a way that is relevant to the operation of the timer 34. For example, exposing the light sensor 38 to light could be an event that activates the timer 34 for the first time. Such activation could begin the timer 34 counting time, which may be associated with the starting point for an associated product's lifetime. The light sensor 38 may include any useful settings or characteristics. For example, in some embodiments, the indicator 32 is activated when the light sensor 38 is impinged by 100 or more lux of light and will remain activated when exposed to more than 30 lux of light. If the light level drops below 30 lux, then the indicator 32 will be temporarily deactivated until the light sensor 38 is exposed to more than 30 lux of light again. Additionally, the timer 34 may be initially activated by a user pushing the test button 40 three times. These numbers may be varied in select applications; it is not the intent of this document to limit these light levels to the example provided.

Test button 40, which may be included in some embodiments but not in others, may provide a way for a user to activate the indicator 32 and observe the indication relating to the age of the product. As discussed above, when the test button 40 is pressed, a sequence may be initiated where the controller 36 activates the indicator 32. Test button 40 may also be used to provide user input for testing, operating, or controlling any function of the indicating assembly 30.

All of the components of the indicating assembly, including the indicator 32, the timer 34, the controller 36, the light sensor 38, and the test button 40 may receive power from the power source 42, which may be, for example, a battery. The power source 42 may be chosen in view of an appropriate product lifetime for an associated product, and may, for example, include a CR2032 coin battery having a seven year battery life.

Indicia for use with the age indicating device 10, may also be provided and is shown in the form of a label 60. The label 60 is designed to be affixed to the age indicator, such as in the form of a sticker. The label 60 may include marketing information 62, such as the name or slogan of a mattress manufacturing retailer. For example, the figures show the marketing information 62 as, "Leggett & Platt" and "Idea Center Innovations." The label 60 shown in the figure also includes a window area 64 and a legend 66. The window area 64 includes one or more transparent panes 68 that are positioned so as to allow a visual indication from the age indicator to be perceived through the label 60, such as, for example, the indications created by a visual indicator including a red LED, a yellow LED, and a green LED, as discussed above with respect to the age indicating device 10. The window area 64 or the panes 68 may have any shape, including square, round, and the like. The legend 66 provides information to a user that may be used in conjunction with the indication, such as, "Green: 0-3 years" at 70, "Yellow: 4 years" at 72, and "Red: 5 years or more" at 74. Thus, a user observing a green LED 50 could easily read the legend 66 and determine that the mattress is between zero and three years old. Similar observations could be made when the mattress is four years old or five or more years old. The label 60 may also include a transparent pane in a region above a light sensor, and may include visual indications for a test button in a region above the test button. The ages may be varied as desired and are not intended to be limited to those shown or described. In some embodiments, all surfaces of the age indicating device 10 may be printed on or are configured for an adhesive label to be attached thereto.

Figure 3:
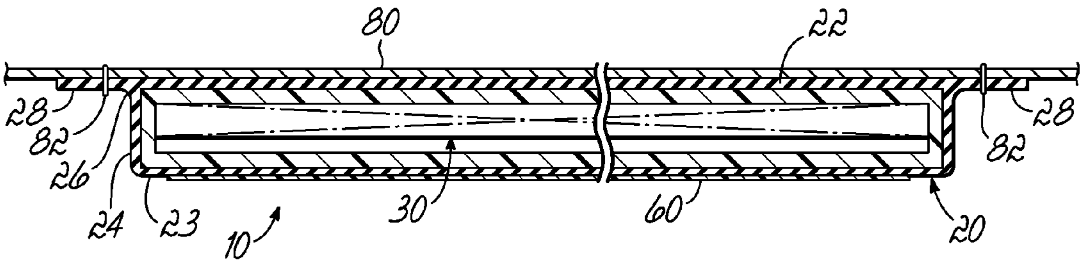
FIG. 3 is a cross-sectional view taken along line 3-3 of FIG. 1.
Figure 3A:
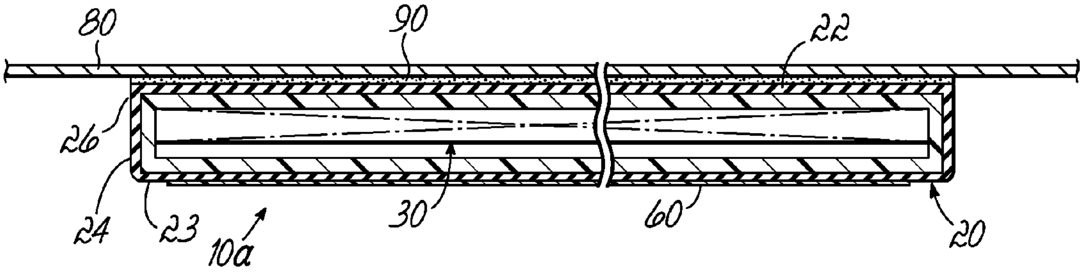
FIG. 3A is a cross-sectional view like FIG. 3 and showing an alternative embodiment of a product age indicator.

An age indicator, such as age indicating device 10, may be attached to a surface in any appropriate way and in any appropriate position. For example, FIG. 1 shows the age indicating device 10 attached to a surface 80, which may be a mattress border or side surface, for example. Stitching may be used to attach the age indicating device 10 to a surface, with the frame portion 28 of age indicating device 10 providing an area for stitching the age indicating device to the surface, such as what is shown at the stitching 82. Also, the age indicating device could be affixed to a mattress using adhesive, with the back 22 being affixed to the upholstery of the mattress. FIG. 3A shows an age indicating device 10*a* attached to the surface 80 by an adhesive layer 90. Because adhesive layer 90 is used, the frame portion 28 is not included and the age indicating device 10*a* is not stitched to the surface. In addition, the age indicating device could be inserted into a pocket on the mattress. Generally, an age indicating device may be coupled with an associated product, whether the associated is a mattress or any other product.

The age indicating device 10 may be any useful size, and in some embodiments has an overall size of 2"×3"×0.125".

In some embodiments that are not shown in the figures, an age indicator or age indicating device such as what has been generally described herein may be used in association with other products, non-limiting examples of which include pillows, mattress protectors, and baby car seats. Also, an age indicating device may include structure for transmitting information, such as information relating to the age of an associated product. In these or other embodiments, the age information may be wirelessly transmitted in a form that is readable by an associated remote assembly. An age indicating device may also include structure for determining the amount of use an associated product experiences.

It will be appreciated by those having skill in the art that any or all of the components of the indicating assembly 30 could be formed integral with any of the other components. For example, the timer could be formed integral with the controller. Also, an age indicator need not include all of the components discussed above. Moreover, the programming of an age indicator controller may be chosen so that indications are presented in any useful manner. For example, the controller may be programmed so that it activates the indicator when a product has reached the end of its useful life, which may take into account the passage of time, the amount of use experienced by a product, or both.

Figure 5:
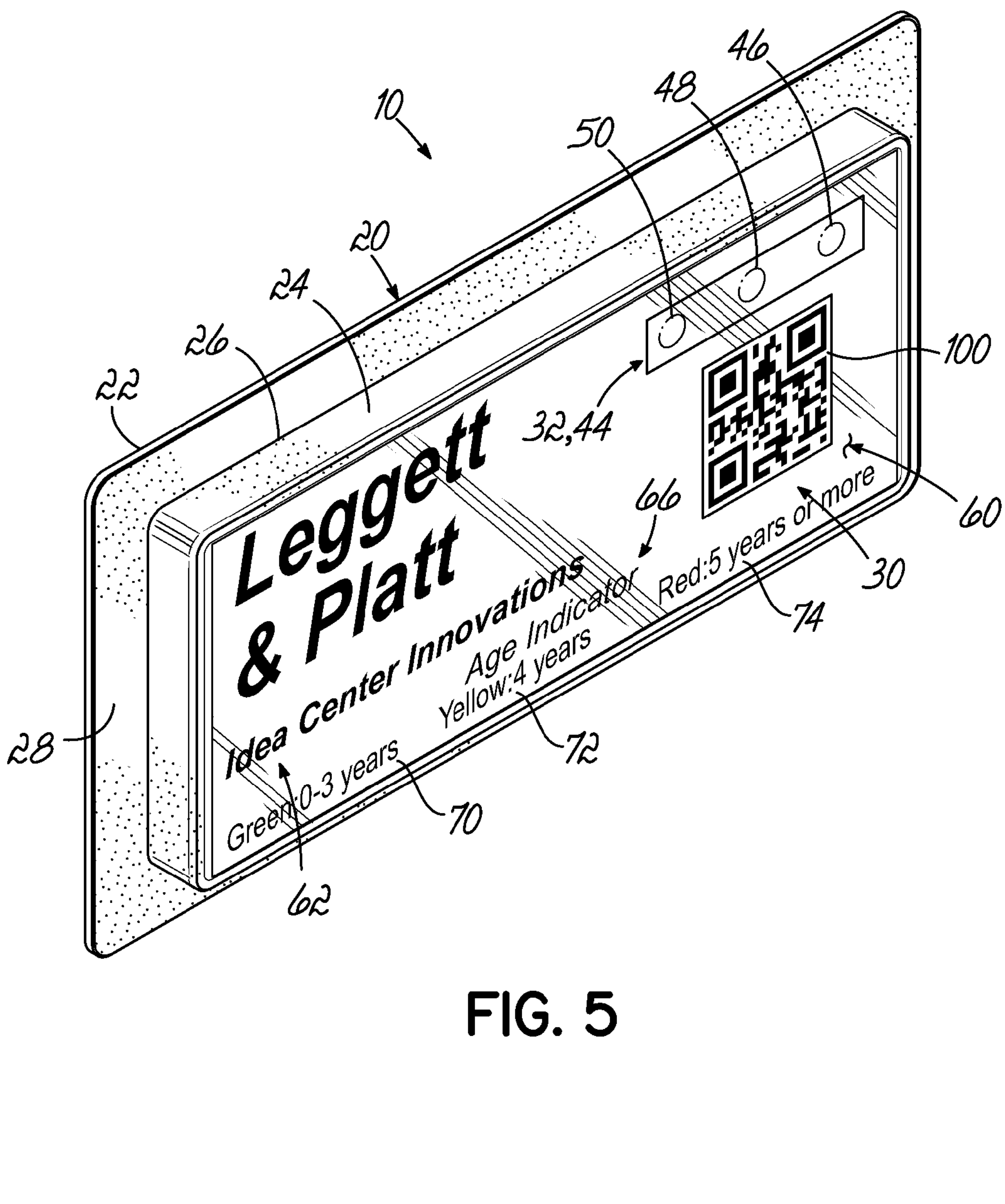
FIG. 5 is an isometric view of a product age indicating device showing another innovative aspect of the age indicating device.

In some embodiments, and with reference to FIG. 5, the age indicating device 10 may include a machine readable barcode, such as a QR code 100, which is a two-dimensional barcode. Machines for reading the QR code 100 are known and do not require further explanation. The QR code 100 advantageously relates to, or is associated with, information relevant to the product to which the age indicating device 10 is attached. Nonlimiting examples of the type of information that the QR code 100 may be related to or associated with include: the product's date of manufacture, the product's date of purchase, a projected expiration date for when the product has reached the end of its useful life, a website URL address, the name of the manufacturer, the name of the retail business where the product was purchased, instructions for care of the product, and any other information. The QR code 100 advantageously is positioned on a portion of the age indicating device that is accessible by a machine for reading it, such as, for example, on the label 60. The QR code 100 may be included with the age indicating device 10 when the age indicating device 10 is manufactured, or the QR code 100 may be supplied after the time of the age indicating device 10 is manufactured, such as in the form of a sticker that is adhered to the age indicating device.

While the invention has been illustrated by the description of embodiments thereof, and while the embodiments have been described in considerable detail, it is not intended to restrict or in any way limit the scope of the appended claims to such detail. Additional advantages and modifications will readily appear to those skilled in the art. Therefore, the invention in its broadest aspects is not limited to the specific details shown and described. The various features disclosed herein may be used in any combination necessary or desired for a particular application. Consequently, departures may be made from the details described herein without departing from the spirit and scope of the claims which follow.

What is claimed is:

1. A mattress age indicating device, comprising:

an enclosure having a portion for coupling the device to a mattress, and an indicating assembly contained within the enclosure, the indicating assembly including a test button, a visual indicator comprising multiple light emitting diodes of different colors, a timer, a controller, a light sensor, and a power source, wherein the timer is initially activated by the test button being pushed multiple times without a time being specified and the controller controls the visual indicator and selectively activates and deactivates at least one of the light emitting diodes to create a colored indication related to the mattress's age as determined by the timer, different colors indicating different ages of the mattress.

2. The device of claim 1, wherein the enclosure includes a back and a cover, and the indicating assembly is positioned between the back and the cover.

3. The device of claim 1, wherein the visual indicator is activated by the controller when the test button is pressed.

4. The device of claim 1, wherein the controller may perform a single sequence of activating and de-activating the visual indicator upon the test button being pressed by a user.

5. The device of claim 4, wherein the controller selectively activates at least one LED to provide the single sequence.

6. The device of claim 1, wherein the visual indicator comprises three LEDs.

7. The device of claim 1, further comprising a label providing information used in conjunction with the indication.

8. The device of claim 1, wherein the visual indicator may be activated by a user pushing the test button.

9. The device of claim 1, wherein the timer may be initially activated upon three pushes of the test button.

10. The device of claim 1, wherein the visual indicator includes color changing dyes.

11. The device of claim 1, wherein the visual indicator includes color changing materials.

12. The device of claim 1, wherein the device is attached to a surface of the mattress.

13. The device of claim 12, wherein the device is attached to a side surface of the mattress.

14. The device of claim 1, wherein a portion of the enclosure, is configured to be attached to the mattress by stitching.

15. The device of claim 1, further comprising a barcode.

16. The device of claim 15, wherein the barcode includes a QR code.

17. An age indicating device for a bedding or seating product, comprising:

an indicating assembly, an enclosure surrounding the indicating assembly and having a portion for coupling the device to the bedding or seating product, wherein the indicating assembly includes a test button, a light sensor, a timer, a controller, and an indicator, and wherein the light sensor, timer, controller, and indicator cooperate to present a colored visual indication related to the bedding or seating product's age, different colors indicating different ages of the product, which visual indication may be activated by the controller upon the light sensor sensing light and the timer is initially activated by the test button being pushed multiple times without a user inputting any time.

18. The device of claim 17, wherein the indicator is a visual indicator and includes at least one LED.

19. The device of claim 17, further comprising a label providing information used in conjunction with the indication.

20. The device of claim 17, further comprising a QR code.

21. An age indicating device for use with an associated bedding or seating product, the age indicating device comprising:

an enclosure, and an indicating assembly contained within the enclosure, the indicating assembly including a timer, a test button, a light sensor, a colored visual indicator, different colors indicating different ages of the product and a controller wherein the visual indicator is activated by the controller when the light sensor senses a predetermined amount of light and the visual indicator is deactivated by the controller when the light sensor senses that the age indicating device is no longer exposed to the predetermined amount of light and wherein the timer is initially activated by the test button being pushed multiple times without any time being specified.

22. The device of claim 21, wherein the visual indicator includes LEDs of different colors.

23. The device of claim 22, wherein the visual indicator includes at least one LED.

24. The device of claim 21, further comprising a QR code.

25. The device of claim 21, wherein the visual indicator is activated by the controller when the test button is pressed.

* * * * *

UNITED STATES PATENT AND TRADEMARK OFFICE

CERTIFICATE OF CORRECTION

PATENT NO. : 8,870,083 B2
APPLICATION NO. : 13/406053
DATED : October 28, 2014
INVENTOR(S) : Terrance L. Myers and John A. Garrett It is certified that error appears in the above-identified patent and that said Letters Patent is hereby corrected as shown below:

In the Specification,

Column 1

Line 13, "when it is fails" should be --when it fails--.

Column 7

Lines 27-28, "enclosure, is configured" should be --enclosure is configured--.

Signed and Sealed this
Seventeenth Day of March, 2015

Michelle K. Lee

Michelle K. Lee
*Director of the United States Patent and Trademark Office*